July 7, 1953 M. DISHAL ET AL 2,644,927

COUPLING CIRCUITS

Filed Nov. 30, 1949

INVENTORS
MILTON DISHAL
JESSE S. LEGRAND
BY R P Morris
ATTORNEY

Patented July 7, 1953 2,644,927

UNITED STATES PATENT OFFICE 2,644,927

COUPLING CIRCUITS

Milton Dishal and Jesse S. Le Grand, Nutley, N. J., assignors to Federal Telecommunication Laboratories, Inc., New York, N. Y., a corporation of Delaware Application November 30, 1949, Serial No. 130,198

13 Claims. (Cl. 333—27)

The present invention relates to coupling circuits for electrical waves of ultra-high frequencies.

The coupling of a tunable source of ultra-high frequencies to a load often presents difficulties, particularly if the output of the source varies over a relatively wide band of frequencies. The reason for this is that any physically practicable coupling circuit will have a frequency-dependent characteristic and that, therefore, a coupling circuit satisfactorily coupling a source to a load at some particular portion of the frequency band will provide a more or less inadequate coupling at other frequencies, particularly at one or both extremities of the range of frequencies to be transmitted.

Where the source is an oscillator, modulator, multiplier or other wave producing means of the type having a resonant circuit located within a shield, and the load is an amplifier, mixer or other wave translating means of like type, the coupling circuit generally comprises a pair of loops, each loop placed within one of the shields near one of the resonant circuits and inter-connected by a suitable transmission line, usually of the coaxial type. If the transmission line and coupling loops are dimensioned so that satisfactory coupling results at the center of the band, considerable mismatch may exist at the extremities; similarly, if the coupling is satisfactory, say, at the upper end of the band, the efficiency of the circuit to transfer energy may be insufficient at the lower end of the band. An additional complication is introduced by the fact that most practicable sources of ultra-high frequencies, which are adapted to be tuned over a wide band, will tend to produce greater energy output at certain portions of the band than at others. Usually there is a falling off of output at one end of the band such as for example, at the lower end with the maximum output towards the middle of the band and the upper end of the band having less than the maximum output but substantially greater than the lower end.

With a selectively tunable source, it is, of course, possible to improve the transmission characteristic of the coupling circuit by making the same adjustable in unison with the source; this, however, introduces undesirable mechanical complications.

It is, accordingly, the general object of the present invention to provide, in an ultra-high frequency system, novel and improved means for transferring wave energy between a source and a load over a wide band of frequencies with substantial avoidance of the aforesaid inconveniences. More particularly it is an object of the present invention to provide, in such a system, fixed coupling means affording effective coupling especially at the extremities of a wide frequency band.

Broadly speaking, the invention provides an ultra-high frequency coupling circuit including transmission means terminating in a coupling device which comprises a plurality of frequency-dependent reactances, the frequency dependence of these reactances being selected so that a first and a second resonance condition will exist in the coupling device at two widely separated frequencies towards or preferably beyond the extremities of the operating band.

According to a preferred embodiment, in which the invention is used for the purpose of coupling a source and a load both of the shielded resonant circuit type, the coupling circuit includes a transmission line terminated at each end in a respective coupling device of the character described, one of the frequency-dependent reactances of each device being represented by a portion of the length of the transmission line, respectively. The source may be tunable over a band at the extremities of which the two resonance frequencies lie (the two devices being similar and, hence, resonant at the same frequencies), and the load may or may not be tunable in unison with the source.

Since the coupling circuit according to the present invention is adapted to give increased transfer at or near the extremities of a frequency band, it may be used in combination with a source whose output decreases at the extremities of the band so that a substantially uniform output throughout the entire band will be obtained.

The invention may also be viewed as providing, in a coupling circuit for ultra-high frequencies, a coaxial transmission line extending through the shield of a wave translating device (such as a source or a load) into the space or cavity within said shield, said line having a discontinuity in its outer conductor inside the space or cavity within the shield, the discontinuity being bridged by a frequency dependent reactance. The sections of transmission line thus divided by said discontinuity also provided resonating reactances.

The above-mentioned and other features and objects of this invention and the manner of attaining them will become more apparent and the invention itself will be best understood, by reference to the following description of an embodiment of the invention taken in conjunction with the accompanying drawings, wherein.

Figure 1:
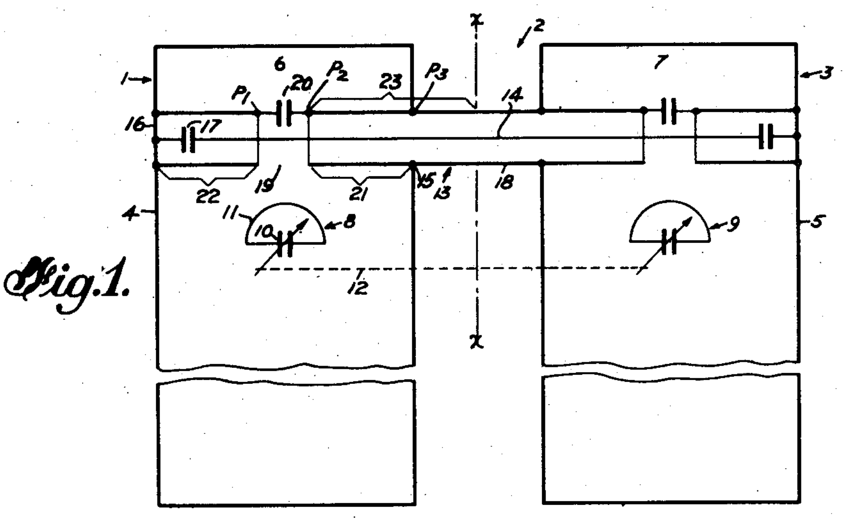
Fig. 1 is a schematic diagram of a shielded source and a shielded load coupled together by a coupling circuit embodying the present invention.
Figure 4:
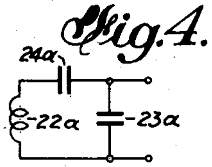
Figs. 4 and 5 are derived from Fig. 3 and represent the parallel circuit therein which is resonant at the higher frequency and the series circuit therein resonant at the lower frequency respectively.

Referring now to Fig. 1, a source of ultra-high frequency oscillations 1 is to be coupled by a coupling circuit generally designated by numeral 2 to a load 3. Both the source and the load are of the shielded type having conductive shields 4 and 5 respectively enclosing spaces or cavities 6 and 7 respectively. The source 1 and the load 3 have resonant circuits 8 and 9 arranged within the cavities 6 and 7 respectively. While the resonant circutis in each case could be in the form of cavity resonators and might for example, be the interior dimensions of the shield, in the embodiment here illustrated resonant circuits 8 and 9 each comprise a tunable condenser 10 connected across a single loop 11 which loop forms the inductive portion of the resonant circuit. The condensers 10 of resonant circuits 8 and 9 may be ganged together by a mechanical link schematically indicated by dotted line 12.

In accordance with the present invention the coupling circuit may comprise a transmission line 13 extending between the source and load and entering each cavity at one point of said shield through one side of the shield and extending to, and terminating at a spaced point such as the opposite side thereof. This transmission line may be in the form of a coaxial line. Since the portion of the transmission line and the elements associated therewith within the shield of the source 1, are similar to those within the shield of load 3, a description of the portion within shield of source 1 will suffice for both. The inner conductor 14 of coaxial line 13 extends through the opening 15 in one wall of shield 4 to the opposite end wall 16 of said shield where they are connected together by the shield. This inner conductor is however broken near wall 16 so as to permit the insertion of a condenser 17 in series with said inner conductor adjacent said wall. The outer conductor 18 of coaxial line 13 is broken away at a point within the cavity intermediate the opposite walls to provide a gap 19. This gap is bridged by a capacitance 20 which may be in the form of an added condenser, or merely projections formed on the outer conductor at opposite ends or points, $P_1$ and $P_2$, facing the gap. The gap 19 separates the two sections of transmission line thus formed within the shield, which sections are designated hereinafter respectively by the numerals 21 and 22. The outer conductor 18 of coaxial line 13 is also electrically connected to the shield at a point $P_3$ adjacent the opening 15.

The resonant circuit 8 is placed with respect to the portions of transmission line 13 within the shield so as to induce a current flow therein. This current in turn, flowing into the similar portions within shield 5 induces a current in resonant circuit 9.

The source 1 may be for example an ultra-high frequency oscillator or a multiplier and the load 3 may be an R. F. amplifier or mixer. In one specific instance the source and load were adapted to operate over a band of frequencies from 225 to 400 megacycles. One such source of ultra-high frequencies was found to give maximum output towards the center of the above-mentioned frequency band, less output at the upper end of said band, and still less output at the lower end of the band. The above described coupling circuit produced a relatively flat transfer over the entire frequency band to the load resonant circuit 9. This was accomplished by adjusting condenser 17 to produce series resonance at a point below the low end of the band, and in the example cited at approximately 210 megacycles. The condenser 20 was tuned to produce parallel resonance at a point above the high end of the band and in the example cited at approximately 420 megacycles.

While several explanations of the operation of the coupling circuits are valid, the following explanation, in which reference is made to the equivalent circuits of Figs. 2, 3, 4 and 5, it is believed will be satisfactory and is relatively simple.

Figure 2:
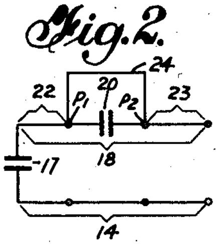
Fig. 2 is an equivalent circuit of the coupling device or arrangement at either the source or load of Fig. 1 (the arrangement at either the source or the load being symmetrically the same).

As has been pointed out before, the coupling circuit 2 is symmetrical: the coupling arrangement within the shield 4 of source 1 is the same as that within the shield 5 of load 3. Because of this symmetry it is theoretically proper to examine either of said coupling arrangements by theoretical breaking coaxial line 13 at a point outside both shields midway therebetween as indicated by the dotted line $x$—$x$ and looking into said break towards the load or the source. Let us designate the section of coaxial line from point $P_2$ to the break at $x$—$x$ by the numeral 23. The theoretical picture thereby disclosed is depicted in Fig. 2 in which transmission line sections 22 and 23 correspond to the similar sections in Fig. 1 with the outer conductor 18 in Fig. 2 of each of the sections, being connected together at points $P_1$ and $P_2$ by condenser 20, and inner conductor 14 being connected by condenser 17 to the outer conductor 18 of section 22, as depicted in Fig. 1. A section of transmission line designated by the numeral 24 appears in Fig. 2 connecting points $P_1$ and $P_2$. This section or stub line 24 is physically realized in Fig. 1 by the outside surface of the outer conductors 18 of sections 21, 22 and the inside conductive surface of the shield.

Figure 3:
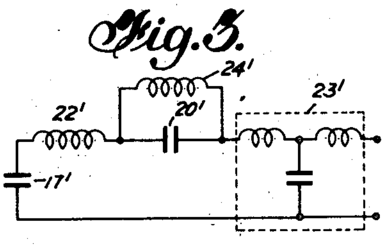
Fig. 3 is a lumped constant equivalent circuit of the device or arrangement of Fig. 2.

The lumped constant circuit of Fig. 3 is derived from Fig. 2 as follows: condenser 17′ represents the capacity of condenser 17; inductance 22′ represents inductance of section 22; condenser 20′ represents the capacity of condenser 20; inductance 24′ represents the inductance of stub line 24, and the combined inductances and capacity 23′ represents those of coaxial line section 23. According to known principles of design, the value of condensers 17 and 20 can be determined to provide for parallel resonance adjacent or above the top of the frequency band and series resonance adjacent or below the bottom of the band. The parallel circuit is disclosed in Fig. 4 and serves to indicate that at the higher frequency adjacent or above the top of the band, the combined reactance of section 22 and its associated condenser 17 is primarily inductive as indicated at 22*a*. At the same high frequency the combined reactance of stub line 24 with its associated condenser 20 is predominately capacitive as indicated at 24a. Likewise at said higher frequency section 23 presents a reactance which is capacitive as indicated at 23a.

Figure 5:
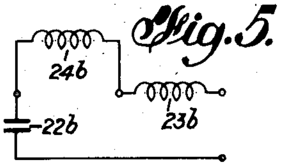

At the lower frequency adjacent or below the bottom of the frequency band, the combined reactance of condenser 17 and section 22 is primarily capacitive as indicated in Fig. 5 at 22b. Stub line 24 with its associated condenser 20 presents primarily an inductive reactance as indicated at 24b, as does section 23 as indicated at 23b.

From the foregoing explanation it is readily apparent how the resonance points above and below the bottom of the band may be selected by selecting suitable values for condensers 17 and 20. By properly selecting the resonance points above and below the bottom of the band as indicated above, the drop in the output of the source at the extremities of the band may be compensated to produce a substantially flat transfer of energy to the load of the entire band.

Figure 6:
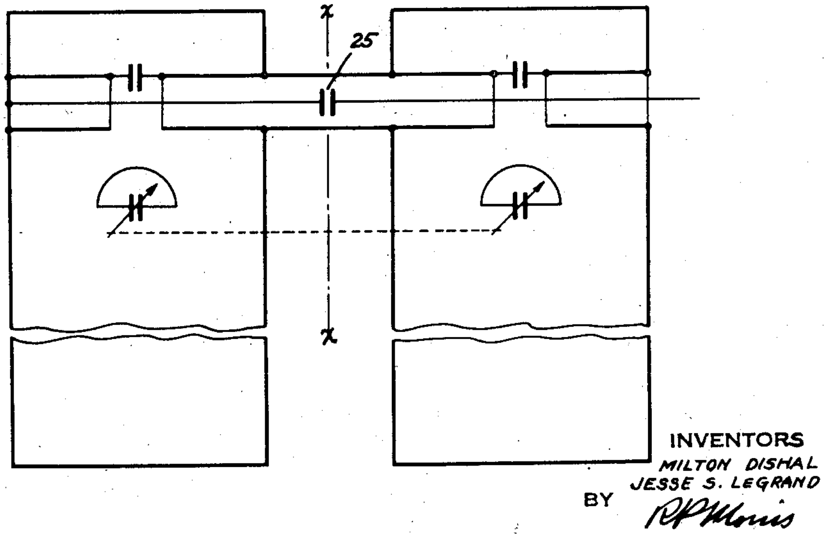
Fig. 6 is a schematic diagram of a modification of the circuit shown in Fig. 1.

Various modifications of the embodiment hereinabove described within the scope of the present invention will readily occur to those versed in the art from the above description. For example, the sections within the shield do not have to be aligned but may be curved. Furthermore as indicated in the modification of Fig. 6, the two condensers 17 within each shield may be replaced by a single condenser 25 which may be inserted for the sake of symmetry midway between the two shields in the coaxial transmission line. Other modifications will likewise be apparent.

Accordingly while we have described above the principles of our invention in connection with specific apparatus and a modification thereof, it is to be clearly understood that this description is made only by way of example and not as a limitation to the scope of our invention.

What is claimed is:

1. In a system for transmitting waves of ultrahigh frequencies, the combination, with a wave translating device having a conductive shield, of a coaxial transmission line having an outer and an inner conductor extending into said shield, said outer and inner conductors being coupled to said shield at one end, said outer conductor being provided with a discontinuity inside said shield, a first frequency-dependent reactance means bridged across said discontinuity, said inner conductor having a discontinuity inside said shield, and a second frequency dependent reactance means bridged across the discontinuity of said inner condutcor, said second frequency-dependent reactance means being adapted to resonate with said first frequency-dependent reactance means at a plurality of widely separated frequencies.

2. The combination according to claim 1 wherein said second frequency-dependent reactance means includes at least one condenser inserted in said inner conductor.

3. The combination according to claim 1 wherein said first frequency-dependent reactance means includes a capacitance bridging the discontinuity in said outer conductor.

4. In a system for transmitting waves of ultrahigh frequencies, the combination, with a source of waves having a conductive shield and a load having a second conductive shield, of a coaxial transmission line having an input end extending into said first shield and an output end extending into said second shield, said transmission line comprising an outer and an inner conductor, said outer and inner conductors being coupled together at each end of the walls of said shields, said outer conductor being provided with two discontinuities, one within each shield, and first and second frequency-dependent reactance means respectively bridged across said discontinuties said inner conductor having two discontinuities one within each shield and third and fourth frequency dependent reactance means respectfully bridged across the discontinuities of said inner conductor, said third and fourth frequency dependent reactance means each being adapted to be resonant with one of said first and second frequency dependent reactance means at a plurality of widely separated frequencies.

5. A broad band coupling arrangement including a shield, a coaxial line, having an inner and outer conductor, extending between spaced points within said shield, said outer and inner conductors being connected together at one of said points by the wall of said shield, the outer conductor alone being connected to the shield at said other point, said outer conductor having a discontinuity at a third point intermediate said first mentioned points, means forming a first capacitance bridging said discontinuity and means forming a second capacitance interposed in series in the inner conductor.

6. A broad band coupling arrangement including a shield, a coaxial line having an inner and outer conductor extending between spaced points within said shield, said outer and inner conductors being connected together at one of said points by the wall of said shield, said shield having an opening at the other of said points through which the coaxial line extends, the outer conductor being connected to the shield at said other point, said outer conductor having a discontinuity at a third point intermediate said spaced points thereby dividing the coaxial line into two coaxial line sections, means forming a first capacitance bridging said discontinuity, and means forming a second capacitance interposed in series in the inner conductor.

7. A broad band coupling arrangement according to claim 5 wherein said first capacitance has a substantially smaller value than said second capacitance.

8. A broad band coupling arrangement according to claim 6 wherein said first capacitance together with the outside of the outer conductor and the inside of the shield together present a combined reactance which is capacitive adjacent the high end of said frequency band and inductive adjacent the low end of said band.

9. A broad band coupling arrangement according to claim 6 wherein said second capacitance and the section of coaxial line whose inner and outer conductors are connected together by the wall of said shield together present a combined reactance which is inductive adjacent the high end of said frequency band and which is capacitive adjacent to the low end of said frequency band.

10. A broad band coupling circuit for coupling a source to a load in which both the source and the load include a shield and a resonant circuit within said shield, comprising a transmission line extending between said source and said load, said transmission line extendinng through an opening in each of said shields and terminating in a coupling arrangement within each shield, said coupling arrangement comprising a coaxial line having an inner and outer conductor extending between spaced points within said shield, said inner and outer conductors being connected together at one of said points by the wall of said shield, the coaxial line extending through an opening in the shield at the other of said points and being connected with said transmission line, said outer conductor being connected to the shield at said other point, said outer conductor having a discontinuity within said shield, and means forming a first capacitance bridging said discontinuity, and means forming a second capacitance interposed in series in the inner conductor.

11. A broad band coupling circuit for coupling a source to a load in which both the source and the load include a shield and a resonant circuit within said shield, comprising a coaxial line having an inner and outer conductor extending between said source and said load, said coaxial line extending through an opening in each of said shields and terminating in a coupling arrangement within each shield; said coupling arrangement comprising a section of said coaxial line extending between spaced points within said shield, said inner and outer conductors being connected together at one of said points by the wall of said shield, said outer conductor being connected to the shield at said other point, said outer conductor having a discontinuity at a third point intermediate said spaced points, and means forming a first capacitance bridging said discontinuity; and means forming a second capacitance interposed in series in the inner conductor of said coaxial line.

12. A broad band coupling circuit according to claim 11 wherein said means forming a second capacitance comprises a condenser interposed in series in the coaxial line at a point outside both shields.

13. A broad band coupling circuit according to claim 11 wherein said means forming a second capacitance comprises two condensers each interposed in series in the inner conductor adjacent said one point in each of the shields.

MILTON DISHAL.
JESSE S. LE GRAND.

References Cited in the file of this patent

UNITED STATES PATENTS

| Number | Name | Date |
|---|---|---|
| 2,030,178 | Potter | Feb. 11, 1936 |
| 2,183,123 | Mason | Dec. 12, 1939 |
| 2,360,475 | Chatterjea et al. | Oct. 17, 1944 |
| 2,515,061 | Smith | July 11, 1950 |

FOREIGN PATENTS

| Number | Country | Date |
|---|---|---|
| 11,625/33 | Australia | Mar. 15, 1934 |
| 123,178 | Australia | Jan. 16, 1947 |